United States Patent
Weeks

(10) Patent No.: US 7,325,558 B2
(45) Date of Patent: Feb. 5, 2008

(54) LANDFILL SITE COVERING SYSTEM

(75) Inventor: Andrew John Weeks, 2 Clobb Farm, Bucklers Hard Road, Beaulieu, Brockenhurst, Hants, SQ42 7XE (GB)

(73) Assignee: Andrew John Weeks, Boaulieu, Brockenhurst Hants (GB)

( * ) Notice: Subject to any disclaimer, the term of this patent is extended or adjusted under 35 U.S.C. 154(b) by 102 days.

(21) Appl. No.: 10/399,338

(22) PCT Filed: Oct. 9, 2001

(86) PCT No.: PCT/GB01/04457

§ 371 (c)(1),
(2), (4) Date: Jul. 28, 2003

(87) PCT Pub. No.: WO02/32594

PCT Pub. Date: Apr. 25, 2002

(65) Prior Publication Data

US 2004/0107985 A1    Jun. 10, 2004

(30) Foreign Application Priority Data

Oct. 14, 2000    (GB) ................... 0025259.3

(51) Int. Cl.
*E04H 15/02* (2006.01)
*B09B 1/00* (2006.01)

(52) U.S. Cl. .................... 135/96; 135/88.01; 135/905; 52/83; 405/129.9

(58) Field of Classification Search .................... 52/63, 52/83, 222, 2.14, 2.16, 2.18, 2.22, 2.25, 125.1; 135/123, 115, 905, 908, 912, 96–97, 88.01; 405/128, 129, 129.9, 129.95; 47/17, 28.1, 47/29

See application file for complete search history.

(56) References Cited

U.S. PATENT DOCUMENTS

| | | | | |
|---|---|---|---|---|
| 2,349,993 | A * | 5/1944 | Schwimmer et al. | 135/97 |
| 3,534,511 | A * | 10/1970 | Cappella | 52/63 |
| 3,922,822 | A * | 12/1975 | Mollinger | 52/63 |
| 3,946,946 | A * | 3/1976 | Hansen et al. | 239/728 |
| 4,651,496 | A * | 3/1987 | Schildge, Jr. | 52/745.06 |
| 4,736,553 | A * | 4/1988 | Geiger | 52/81.2 |
| 4,887,627 | A * | 12/1989 | Audet | 135/120.1 |
| D383,187 | S * | 9/1997 | Dalland | D21/837 |
| 5,716,165 | A | 2/1998 | Burgert | |

FOREIGN PATENT DOCUMENTS

| | | |
|---|---|---|
| DE | 29 24 256 | 12/1980 |
| EP | 0906795 | 4/1999 |
| EP | 0923999 | 6/1999 |
| GB | 2073802 | 10/1980 |
| GB | 2278862 | 12/1994 |
| JP | 7-229307 | * 8/1995 |

* cited by examiner

*Primary Examiner*—Winnie Yip
(74) *Attorney, Agent, or Firm*—Fulbright & Jaworski

(57) ABSTRACT

The present invention provides a landfill site covering system. The system comprises a plurality of freely mobile support members (2) with a cable array (20 22, 24) secured to the support members (2) to form a supporting framework. Covering material (26, 28) is attached to the supporting framework; to form an enclosure.

11 Claims, 2 Drawing Sheets

LANDFILL SITE COVERING SYSTEM

BACKGROUND OF THE INVENTION

The present invention relates to a landfill site covering system, particularly to a mobile landfill site covering system.

Much domestic and commercial refuse is disposed of in landfill sites. Such landfill sites commonly attract large numbers of birds. This presents a particular problem near airports, where large numbers of birds increase the risk of hazardous bird strikes during landing or take-off of aircraft. In order to minimise this risk, many national aviation authorities carefully control land usage around airports. For example, in the UK, the Civil Aviation Authority requires complete covering of landfill sites within 8 miles of an airport. Such covering also prevents surface litter from blowing out of the site.

One current method of covering a landfill site involves the erection of large support posts which are anchored in the ground (usually in concrete) in a rectangular configuration, with wires strung between pairs of posts to form a support structure. A net is then spread over the wire support structure and secured to the ground around the posts to form a completely enclosed space. The posts are generally between about 6 to 30 m in length to enable waste lorries to drive onto the site and unload beneath the cover (the netting on one side being partially retractable to allow vehicle entry). When the covered region of the site has been filled with waste and overlaid with soil, the covering can be disassembled and re-erected at a different location on the site. It will be understood that the erection, disassembly and re-erection of such a cover is time consuming and expensive and permits little flexibility in site usage.

A partial solution to this problem is to mount support posts on rollers on a pair of pre-prepared runways. The runways are laid on parallel raised banks having flattened tops. As described above, netting is spread over wires arranged between corresponding posts on each runway. When a particular area between the posts is filled to the required depth, the posts and netting cover can be moved (by using a vehicle to drag the posts along the runway) to cover a different region between the banks. Such a method, although offering some flexibility is still expensive. In addition, the ground must be prepared for the laying of the runways. Several sets of runways may be required.

It is an object of the present invention to provide an improved landfill site covering system which obviates or mitigates one or more of the disadvantages of the known systems.

BRIEF SUMMARY OF THE INVENTION

According to the present invention, there is provided a landfill site covering system comprising:

(i) a plurality of freely mobile support members, (ii) a cable array secured to the support members to form a supporting framework, (iii) covering material attached to the supporting framework whereby to form an enclosure.

As used herein, "freely mobile" means capable of movement along the ground in all directions.

Advantageously, the system of the present invention can be moved from one part of a landfill site to another without being dismantled.

Preferably, each support member is self standing, i.e. the support members are not anchored into the ground. Preferably, each support member is moveable independently of the others.

Preferably, each support member is self-propelled. More preferably, each support member comprises a motorised platform. Most preferably said motorised platform is provided with tracks to facilitate movement over uneven ground. In a highly preferred embodiment, said support member comprises an arm mounted on an extendable boom of the motorised platform.

Preferably, means are provided to enable the height above ground of the supporting framework to be altered. To achieve this, telescopic support members may be used. However, it will be understood that when each support member comprises an extendable boom, the height of the supporting framework can be altered by raising or lowering the booms.

Preferably, adjustable tensioners are provided to enable the cable array to be evenly tensioned.

Preferably, means are provided to retain edge regions of the covering material against the ground. This may be achieved by, for example, weighting said edge regions. In one particular embodiment, said edge regions are weighted by a length of water-filled flexible hose. Preferably, said edge regions are formed into a tube within which the water-filled flexible hose is located.

Preferably, the covering material is netting. It will be understood that the mesh of the netting must be small enough to prevent birds such as seagulls and pigeons passing therethrough. A suitable mesh size is about 100 mm or less (eg 85 mm). Preferably, the netting is secured to the supporting structure by a plurality of ties or clips.

Preferably, a first piece of netting is arranged on top of the supporting structure to form a roof and additional pieces of netting depend downwardly from the roof to the ground to form the sides of the enclosure.

In a particularly preferred embodiment, four support members are arranged at the corners of a square (or rectangle) with a primary cable suspended between each pair of adjacent support members. It will be understood that in the above configuration, four such primary cables define the sides of the enclosure (said four cables hereinafter referred to as primary side cables). Preferably, an additional primary cable extends from each support member to the centre of the enclosure with the additional primary cables (hereinafter referred to as primary cross cables) being mutually connected at their free ends (eg. by attachment to a ring).

Preferably, secondary cables are attached to the primary cross cables parallel to the primary side cables to form a plurality of concentric squares, the primary and secondary cables defining the supporting framework. Preferably, an adjustable tensioner is provided at one end at least of each primary cable and more preferably at both ends of each primary side cable.

BRIEF DESCRIPTION OF THE SEVERAL VIEWS OF THE DRAWINGS

An embodiment of the present invention will now be described by way of example only with reference to the accompanying drawings in which:—

DETAILED DESCRIPTION OF THE INVENTION

Figure 1:
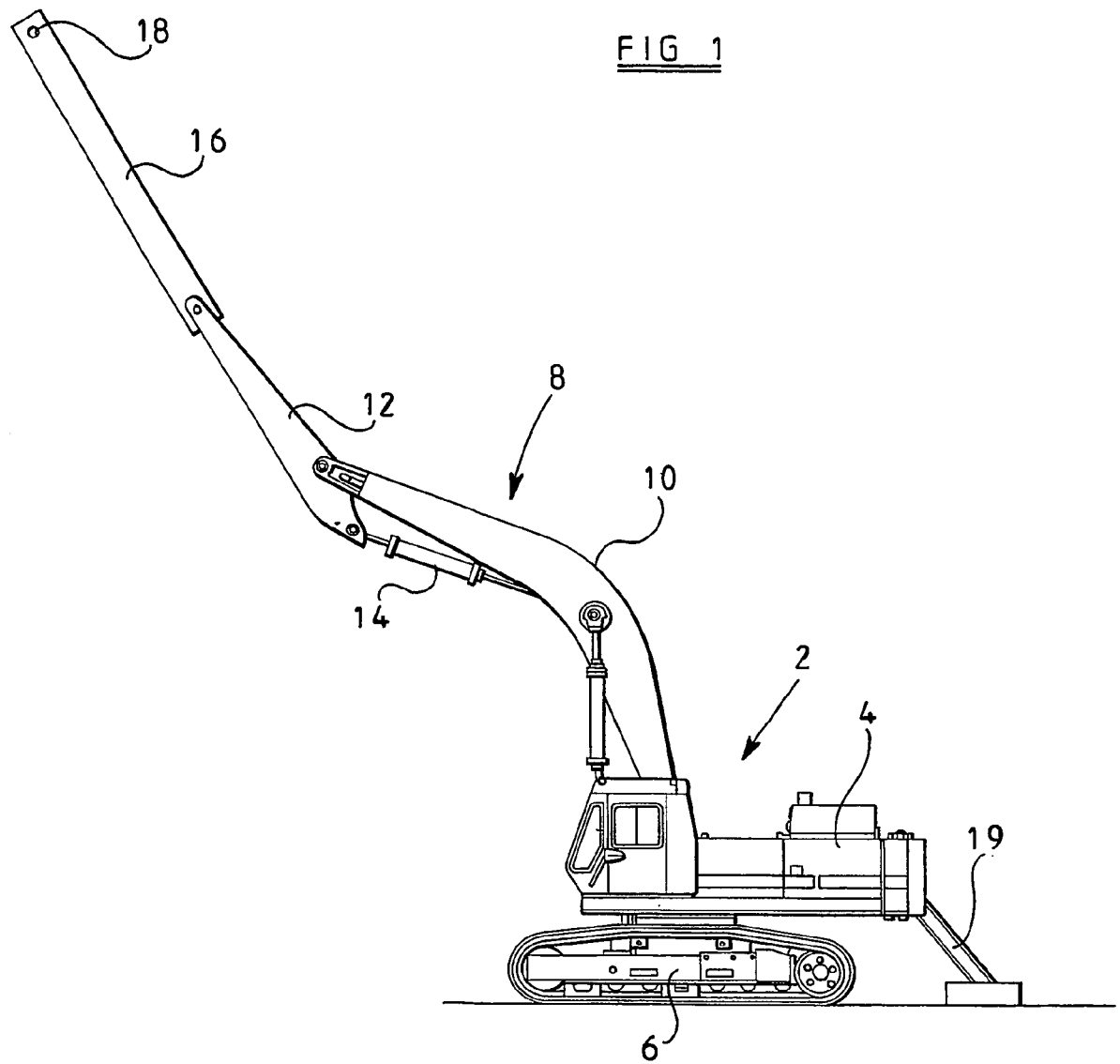
FIG. 1 is a schematic side view of part of the system shown in FIG. 2.

Referring to FIG. 1, an excavator 2 of a per se known type has a body section 4 pivotable through 360° about a tracked base 6. Pivotably mounted towards the front of the body section 4 is a two part boom 8 comprising first and second boom sections 10,12 pivotally connected and mutually pivotable by a hydraulic ram 14. The boom 8 is a standard excavator boom but the second boom section 12 ("dipper arm") has been disconnected from the first section 10 and refitted in an upside down configuration as shown. It has been found that by inverting the second boom section 12, greater height and flexibility can be achieved in use. To the free end of the second boom section 12 is welded a steel arm 16 within which an eyelet 18 is formed. A retractable stabilising leg 19 extends from the rear of the body section 4.

Figure 2:
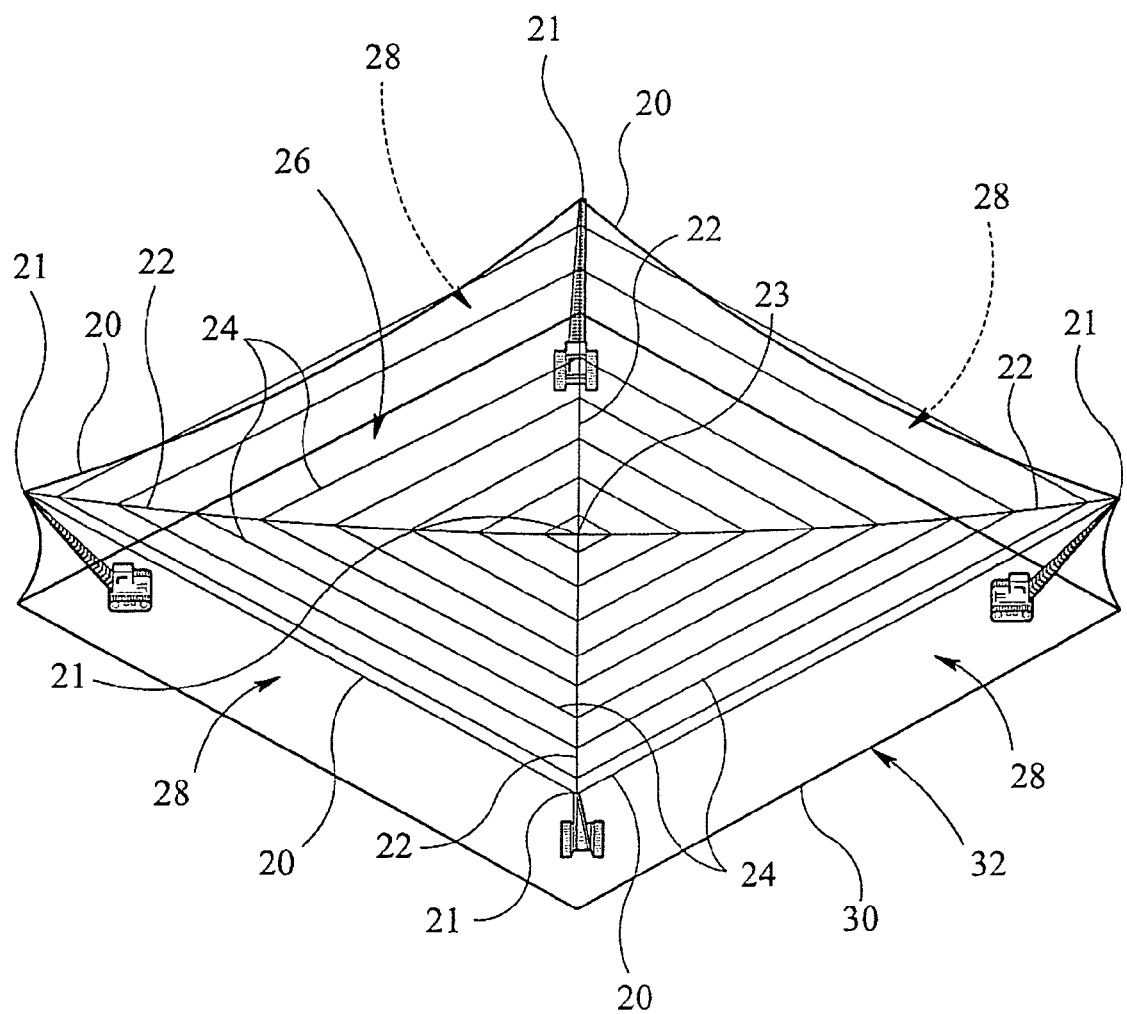
FIG. 2 is a schematic perspective view of a landfill site covering system in accordance with the present invention.

Referring to FIG. 2, four of the excavators 2 shown in FIG. 1 are arranged at the corners of a square (80 m×80 m), with the booms 8 projecting outwardly from the centre of the square. Each excavator 2 is stabilised by its stabilising leg and by a 5000 Kg water tank (not shown) which rests on the ground outside the square and which is attached by a cable to the boom 8. The sides of the square are defined by four primary side cables 20 which are suspended between adjacent excavators 2. Each cable 20 is provided with an adjustable spring tensioner 21 at each end, the tensioners 21 being secured to the eyelet 18 of the respective steel arm 16. A primary cross cable 22 extends from the eyelet 18 of each excavator 2 towards the centre of the square where each is secured to a metal ring 23 via a respective additional spring tensioner 21. The booms 8 of the excavators 2 are in an elevated position so that the primary cables 20 are about 15 m from the ground.

At spaced intervals (in this case 10 m between each pair of primary cross cables 22, secondary cables 24 are suspended parallel to the primary side cables 20, thereby forming a number of concentric squares ("spider's web" configuration). Together, the primary and secondary cables 20,22,24 define a supporting framework to which netting is secured. Roof netting 26 (polypropylene 210/48 twisted, 85 mm square mesh) overlays the cable framework and is secured along its edges to the primary side cables 20 at spaced intervals with plastic ties (not shown). The roof netting 26 is also secured at intervals along the primary cross cables 22 and the secondary cables. Four side nets 28 (polyethylene 3 mm braided, 85 mm square mesh) are secured with plastic ties to a different one of each of the primary side cables 20 and held against the ground by 150 mm diameter flexible water hose 30 (e.g. a canvas rubberised hose) filled with water. This is achieved by looping the side nets 28 under the hose 30 and hooking the bottom edges onto the side nets thereby forming a cradle 32 in which the hose 30 is held. Adjacent edges of the side nets 28 are secured to each other using plastic ties which are adapted to release on experiencing a predetermined force. This represents a designed weak point in the system to minimise damage in extreme weather conditions. The roof and side nets 26,28 define an enclosure into which birds cannot gain access and out of which pieces of loose litter cannot be blown.

Along one side of the enclosure, a small additional sealed net structure is provided (not shown) to accept a lorry, one of the side nets 28 being provided with an opening for the lorry.

In the above described embodiment, the primary cables 20,22 are wire rope cables (tensioned to about 16 tonnes) and the secondary cables 24 are wire rope cables (capable of withstanding tensioning up to about 8 tonnes). The system is designed to withstand up to 103 mph (46 m/s) wind loading and with 25% build up of litter on the leeward side a wind loading of 65 mph (29 m/s). However, it will be understood that the specification of the cables can be varied, inter alia, according to their length (i.e. required enclosure size) and anticipated wind loadings.

Assembly of the enclosure is easily achieved. The excavators 2 are moved into approximate position and the cables 20,22,24 are laid out on the ground and the cable array formed. The roof netting 26 is then laid over the cables 20,22,24. The booms 8 of the excavators 2 are lowered to approximately 1 m from the ground and the primary and secondary cables 20,22,24 attached to the steel arm eyelets 18. The roof netting 26 is then secured to the cables 20,22,24 and the side nets 28 also attached. The (empty) water tanks are attached to the excavator booms 8 via cables. The booms 8 are then raised and the flexible hose 30 is laid around the base of the side nets 28. If necessary one or more of the excavators 2 can be maneuvered for optimum positioning of the cable framework.

Once the operator is satisfied that the positioning of the excavators 2 is correct, the stabilising legs 19 are deployed and the water tanks are filled. The flexible hose 30 is also filled, thereby securing the side nets 28 to the ground. The booms 8 are then raised to their final operational height and the tensioners 21 adjusted to provide an even tension between the primary cables 20,22.

The area within the enclosure (except the excavator footprints) can then be filled with waste material. This will usually be to a depth of about 2 m. When this depth has been achieved, the excavators 2 are separately tracked several meters towards the centre of the square onto the filled area to allow the excavator footprints to be filled to a corresponding depth. The enclosure is maintained in the same position during movement of the excavators 2 by extending the booms 8 to maintain the height and tension of the cables 20,22.

Movement of the system across the site is easily and rapidly achieved. The booms 8 are lowered to reduce tension in the primary cables 20,22 and the excavators 2 moved towards the centre of the square until the metal ring 23 is about 2 m from the ground. The water in the flexible hose 30 and water tanks is then released and the base of the side nets 28 hooked up clear of the ground. The excavators 2 are then simultaneously driven in a co-ordinated manner to maintain the cable framework evenly suspended, co-ordinated by an operator on the ground. Once in position the excavators 2 are driven apart to retension the cables 20,22 and the side nets 28 are unhooked. The flexible hose 30 and water tanks are positioned and refilled with water.

Importantly, the system does not require any ground preparation before being assembled and can be quickly and easily moved from one part of a site to any other without requiring disassembly and without damaging the landfill sub structure. Relocation can be achieved overnight, and does not require closure of the site. Conveniently, since the excavators remain stationary most of the time, inexpensive second hand excavators which have reached the end of their normal operating life can be used.

The invention claimed is:

1. A landfill site covering system comprising:
   (i) a plurality of freely mobile support members, which are capable of movement along the ground in all directions,
   (ii) a cable array secured to the support members to form a supporting framework,
   (iii) covering material attached to the supporting framework whereby to form an enclosure,
   wherein the freely mobile support members have a body section and a tracked base, and the body section and the tracked base are relatively pivotable through 360 degrees.

2. A landfill site covering system as claimed in claim 1, wherein each support member is self standing.

3. A landfill site covering system as claimed in claim 2, wherein each support member is moveable independently of the others.

4. A landfill site covering system as claimed in claim 1, wherein each support member is self-propelled.

5. A landfill site covering system as claimed in claim 1, wherein each support member comprises an arm mounted on a motorised platform.

6. A landfill site covering system as claimed in claim 1, further comprising a length of water-filled flexible hose to retain edge regions of the covering material against the ground.

7. A landfill site covering system as claimed in claim 1, wherein a first piece of covering material is arranged on top of the supporting structure to form a roof and additional pieces of covering material depend downwardly from the roof to the ground to form the sides of the enclosure.

8. A landfill site covering system as claimed in claim 1, wherein the covering material is netting.

9. A landfill site covering system as claimed in claim 1, wherein four support members are arranged at the corners of a square or rectangle with a primary cable suspended between each pair of adjacent support members.

10. A landfill site covering system as claimed in claim 9, wherein an additional primary cable extends from each support member to the centre of the enclosure with the additional primary cables being mutually connected at their free ends.

11. A landfill site covering system as claimed in claim 10, wherein secondary cables are attached to said additional primary cables parallel to the primary cables to form a plurality of concentric squares, the primary and secondary cables defining the supporting framework.

* * * * *